United States
Wuerker et al.

[11] 3,784,276
[45] Jan. 8, 1974

[54] HOLOGRAPHIC APPARATUS FOR LARGE FIELD OF VIEW

[75] Inventors: Ralph F. Wuerker, Palos Verdes Estates; Leo O. Heflinger, Torrance, both of Calif.

[73] Assignee: TRW Inc., Redonda Beach, Calif.

[22] Filed: Oct. 16, 1972

[21] Appl. No.: 297,783

[52] U.S. Cl. .................... 350/3.5, 350/172, 350/293
[51] Int. Cl. ........................................... G02b 27/00
[58] Field of Search ....................................... 350/3.5

[56] References Cited
UNITED STATES PATENTS
3,606,519  9/1971  Kurtz .................................... 350/3.5
3,704,930  12/1972  McMahon ........................... 350/3.5

OTHER PUBLICATIONS
Ross "Ring Hologram For 3-D Display–Single Concept Motion Picture" IBM Technical Disclosure Bulletin Vol. 9 No. 4 Sept. 1966, p. 390.
O'Hare "A Holographic Flow Visualization System" Conference: Proceedings of the SPIE 14 Annual Technical Symposium, San Francisco, Calif. Aug. 11-14, 1969, pp. 499-510.

Primary Examiner—John K. Corbin
Attorney—Daniel T. Anderson, Edwin A. Oser and Jerry A. Dinardo

[57] ABSTRACT

A holographic apparatus permitting holographing of an object in transmission to provide a viewing angle which may be as large as substantially 180°. The apparatus is particularly suitable for taking holograms of aerodynamic phenomena such, for example, as a wake of a bullet or the perturbations created in a wind tunnel by a model plane. One form of the holocamera includes a lens for generating a virtual point source for a reference beam while the scene beam is projected radially through the phenomenon to be recorded. Another embodiment makes use of a specially recorded hologram to diffract the reference beam onto a recording material so that the reference beam has a virtual point source along the axis of a wind tunnel or the like. This hologram serving as an optical element may be recorded in situ.

9 Claims, 6 Drawing Figures

HOLOGRAPHIC APPARATUS FOR LARGE FIELD OF VIEW

BACKGROUND OF THE INVENTION

This invention relates generally to holographic apparatus for recording in transmission a hologram of an object and particularly relates to such an apparatus permitting a field of view of the recorded hologram of substantially 180° or less.

Holographic interferometry has been found to be an efficient and useful tool for recording deformations of objects due to mechanical stress. It has also found application in recording aerodynamic phenomena such, for example, as the wake of a bullet or the air disturbed by an object in a wind tunnel. This may be effected by double exposure holography, that is by first taking a hologram of an undisturbed object space and thereafter taking a second hologram on the same recording material with the disturbed object space. For example, the first hologram may be taken of the undisturbed air and the second hologram may be recorded on the same recording material of the air disturbed by the passage of a bullet.

However, it has been found that some of these ballistic or aerodynamic phenomena are not symmetrical. Therefore, a conventional hologram through the wake of a bullet, for example, may not be sufficient to analyze the results of the disturbance created by a bullet. In particular, it is highly desirable to derive aerodynamic densities from such non-symmetrical aerodynamic phenomena. It has been found that it is sufficient to provide a continuous 180° field of view to obtain all the necessary aerodynamic data.

It is accordingly an object of the present invention to provide a transmission holographic apparatus which permits a continuous view of substantially 180° or less of an object to be recorded.

Another object of the present invention is to provide holographic apparatus of the type discussed which is suitable for recording the aerodynamic wake of a bullet or which may be used with a conventional wind tunnel.

A further object of the invention is to provide a holographic apparatus which permits to derive aerodynamic densities for nonsymmetrical ballistic or aerodynamic phenomena.

SUMMARY OF THE INVENTION

A holographic apparatus in accordance with the present invention permits viewing of an object in transmission through an angle of substantially 180° or less. The apparatus comprises means for generating both a coherent scene beam and a coherent reference beam. A recording material is disposed along a substantial portion of the surface of a cylinder. This cylinder has a central axis along which the object to be holographed is disposed. A first diffuser is disposed in the path of the scene beam. A conical reflector follows the first diffuser and is disposed to project the scene beam through the object onto the recording material. The conical reflector is centered on the central axis. Finally, optical means are provided for projecting the reference beam onto the recording material. The reference beam has a virtual point source located along the central axis.

In one embodiment the optical means for projecting the reference beam consists preferably of a negative lens disposed in the neighborhood of the central axis. However, it is also possible to use a positive lens. In another embodiment the optical means consists of a hologram previously recorded for diffracting the reference beam onto the hologram. This hologram or optical element provides a virtual point source on the central axis.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
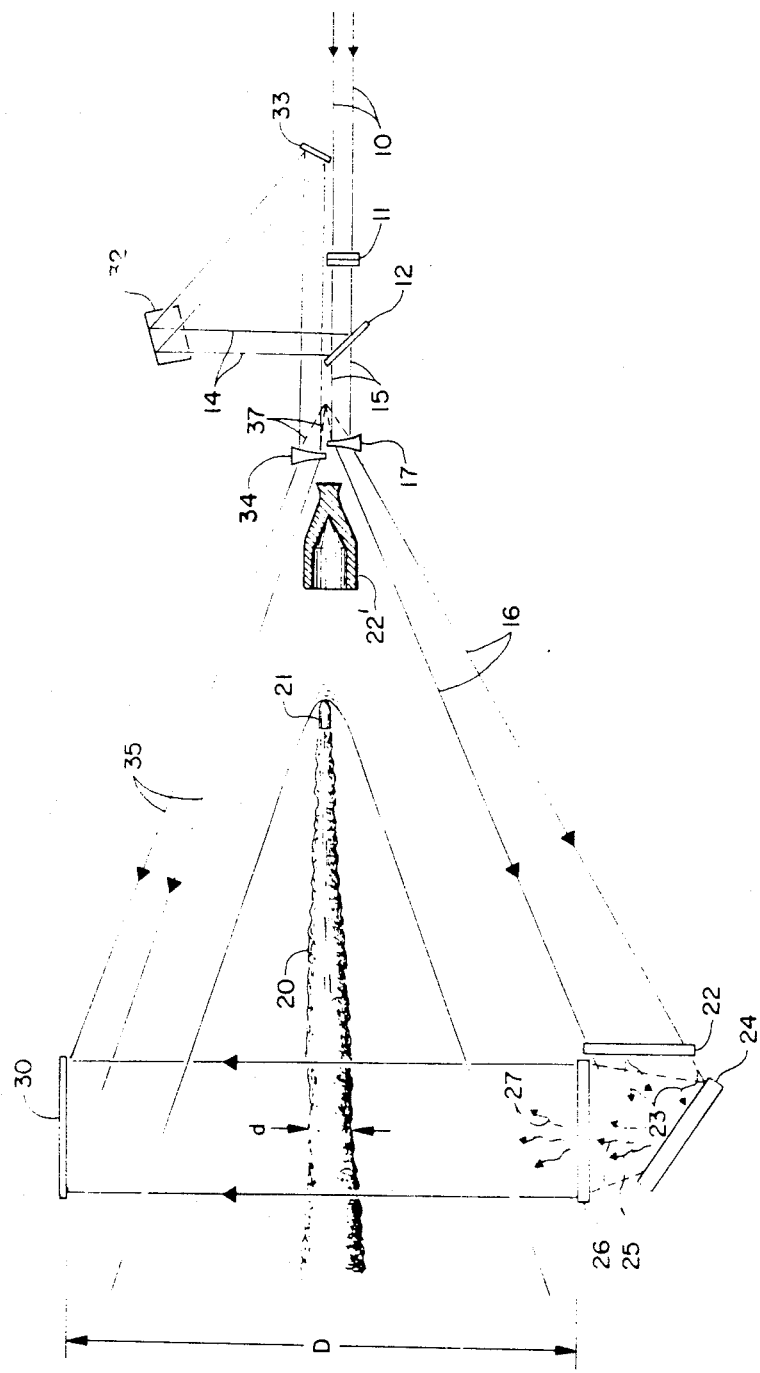
FIG. 1 is a cross-sectional view of a holographic apparatus in accordance with the present invention for recording the aerodynamic wake of a bullet.
Figure 2:
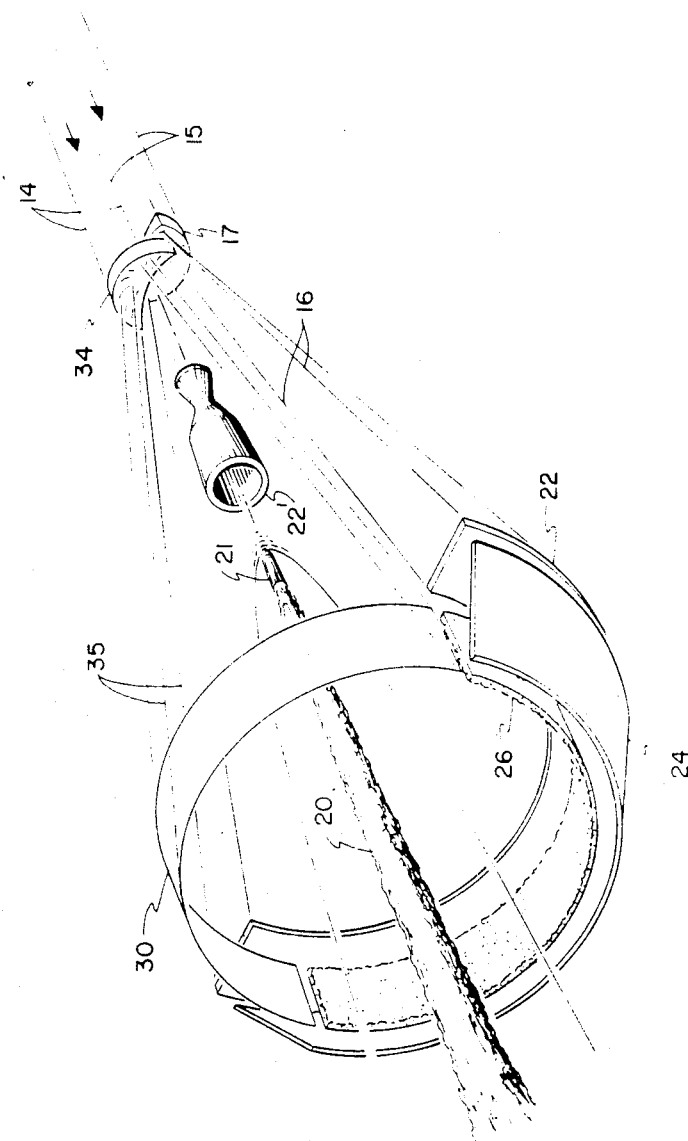
FIG. 2 is a view in perspective of a portion of the apparatus of FIG. 1.

Referring now to FIGS. 1 and 2, there is illustrated a holographic apparatus which permits a continuum of viewing angles of an object in transparency such, for example, as the wake of a bullet. Such a holographic apparatus clearly facilitates the reduction of asymmetric flow field data. The apparatus of FIGS. 1 and 2 may be used for taking holograms of a variety of subjects. As shown in FIGS. 1 and 2, this may be the aerodynamic wake of a bullet. Alternatively, aerodynamic phenomena surrounding, for example, gas jets or spark gap discharges may be recorded.

The apparatus of FIG. 1 includes a laser or equivalent light source, not shown, for generating a coherent light beam 10. The light beam may be passed through a quarter wave plate 11 for the purpose of providing a circularly polarized wave. However, the use of the quarter wave plate 11 is optional, and the effects of a circularly polarized, coherent light beam will be subsequently explained. The light beam 10 is then split by a beam splitter 12 into a reference beam 14 and a scene beam 15. The scene beam 15 is then spread out into a cone-shaped beam 16 by means of a negative lens 17 which may simply be considered to be one half of a normal or conventional negative lens. The other half of the negative lens 17 is used for the reference beam as will be more fully explained hereinafter.

The cone-shaped scene beam 16 extends substantially over 180° of a surface normal to the aerodynamic wake 20 of a bullet 21. The wake 20 defines a central axis for the entire apparatus. The bullet 21 may be received by a bullet catcher 22' so as to protect the optical equipment such as beam splitter 12 and lens 15 which are disposed close to the central axis of the apparatus.

Interposed into the path of the scene beam 16 is a first diffuser 22 extending substantially normal to the central axis of the apparatus and having an annular shape as shown more clearly in FIG. 2. Accordingly, the scene beam 16 is diffused as indicated by the wavy arrows 23 and impinges on a conical reflector 24 which has an axis coinciding with the central axis of the apparatus. The conical reflector 24 extends substantially over 180° surrounding the aerodynamic wake 20. Since the light is diffused the reflector 24 need not be of good optical quality and may, for example, consist of a conically shaped piece of aluminum which may be buffed to provide sufficient reflection. The light reflected from the conical reflector 24 is shown by the wavy arrows 25. There may further be provided a second diffuser 26 of semicylindrical shape. The cylinder of which the diffuser 26 forms one-half has an axis coinciding with the central axis. The light diffused by the second diffuser is indicated by the wavy arrows 27. However, it should be noted that only one diffuser is needed for the apparatus of the invention. If two diffusers such as 22 and 26 are used they provide a more uniform field, that is a more uniform light distribution. However, the uniformity of the beam must be balanced against the coherence which may be limited. Thus, if the coherence length is small it is desirable to use only one diffuser. Alternatively, it is possible to provide one diffuser which scatters light over a relatively narrow angle. Such a diffuser may be made by coating the sanded surface of the diffuser with a lacquer overcoat.

A semi-cylindrical recording material 30 is disposed adjacent and substantially contiguous to the diffuser 26. In other words, the recording material 30 and the diffuser 26 jointly form a cylinder having an axis coinciding with the central axis of the apparatus. As illustrated in FIG. 1, the diameter of the cylinder formed by diffuser 26 and recording material 30 is D while the diameter of the object to be holographed such as the wake 20 may be designated d. The recording material 30 may consist, for example, of a strip of holographic film, that is a film having the required high resolution. It will be noted that the scene beam 16 impinges on the recording material 30 substantially at an angle of 90° after having passed the wake 20.

It should be noted that the laser which has not been illustrated may, for example, consist of a Q-switched ruby laser. If the phenomenon to be holographed is not too fast Q switching may not be necessary. If precise timing is not essential a ruby laser with a mode selector such as a dye cell may be found to be desirable.

The reference beam 14 is reflected by a roof prism or roof mirror 32. The reference beam is then subsequently reflected by a reflector 33 such as a front surface mirror and then impinges upon a negative lens 34 which is the counterpart of the negative lens 17. In other words, the lens 34 may be imagined as the corresponding half of the negative lens 17. It serves the purpose to generate a cone-shaped reference beam 35 which now impinges on and substantially fills the recording material 30. As will be seen from FIG. 1, the reference beam 35 may impinge on the recording material at an angle of approximately 20° so that the angle between reference and scene beam at the recording material is approximately 70°.

For such an angle efficient regions of constructive interference are separated by an amount of 0.6 microns, assuming the wavelength of a ruby laser. This is well within the resolution capabilities of presently available holographic emulsions. Although angles smaller than 70° between the scene and reference beams are preferred for reasons of polarization effects and diffraction efficiencies, good results have been obtained in the past even with beam angles between scene and reference beam as large as 100°.

It will be appreciated that since the coherence length of presently available ruby lasers is still rather limited, it is important to provide temporal coherence matching between reference and scene beams. This can be readily achieved by adjustment of the distance between the roof reflector 32 and the reflector 33. Also, the roof prism 32 serves the purpose to ensure that the same portion of the original beam 10 will arrive at the same point of the recording material 30 for both reference and scene beam portions.

It should be noted that the negative lens 34 creates a virtual reference point source 37 substantially along the central axis of the apparatus.

As indicated before, the use of the quarter wave plate 11 is optional. It will provide a circularly polarized light beam for both reference and scene beams. If the two beams are linearly polarized it is not sure that both beams will have the same polarization over the entire surface of the recording material 30. It will be appreciated that both beams should be polarized in the same direction so that they are capable of interfering. It is also feasible to dispose the polarizer 11 further downstream of the beam 10 or to provide a separate polarizer for the reference beam and the scene beam. In any case it is necessary that the two beams have at least a component at the recording material 30 with coinciding polarization.

The apparatus illustrated in FIGS. 1 and 2 actually has a viewing angle which is a function of the size of the subject. It can be shown that the viewing angle $\alpha$ is related to the ratio $d/D$ as follows:

$$\alpha = 180° - 2 \text{ Arc sin } d/D$$

This function may be plotted and it has been found that if the ratio $d/D$ is 0.1 or less, the actual viewing angle is close to 180°. With larger ratios the viewing angle decreases.

The hologram of an object such as the wake 20 is obtained by double exposure. In other words, a first hologram is recorded without the object, that is of the undisturbed air. The first exposure also carries all the pecularities of the apparatus, (i.e. the ground glass diffusers, the conical mirror etc.). The second hologram is taken with the disturbance to be holographed. The processed hologram then shows interference fringes indicative of the difference in path lengths of the scene beam due to the disturbance of the air between the two exposures. It will also be appreciated that the apparatus is suitable only for holograms in transmission.

The recorded hologram may be reconstructed in the following manner. The developed recording material is returned to its original position. Alternatively, it may be placed in a holder which disposes it similarly with respect to the reconstruction light as it occupied during recording with respect to the reference beam. It is then illuminated again in the same or similar apparatus by the reference beam 35 having a virtual point source 37. In general it is not practical to view the hologram in the light of a ruby laser because the ruby laser usually cannot be operated to generate a continuous wave. Hence the hologram may be reconstructed with a helium-neon laser operated to generate a continuous wave. Such a laser has a somewhat shorter wavelength than a ruby laser which will give a certain amount of distortion. This, however, may be compensated by a displacement of the reconstruction source.

It is now possible to view the hologram by looking through the hologram into the apparatus like a window. The hologram may be viewed by the naked eye or it may be photographed. Alternatively, optics may be used for viewing. For example, a telecentric optical system may be used to examine only paths perpendicular to the flight of the bullet 21. Such a telecentric system is basically a long focal length field lens. The copy camera lens is located at the focal plane of the field lens. The camera is focused through the field lens at the object. The result of viewing through the field lens is that one sees only rays from the glass diffuser 26 which travel perpendicular to the flight path. A large field lens limits the field of view in accordance with formula (1). Of course it is feasible to eliminate the field lens and focus the copy camera directly on the flight path.

The holographic apparatus of FIGS. 1 and 2 has the disadvantage that it is not suitable for use with a wind tunnel. The reason is that the optics such as the lenses 17 and 34 are directly in the path of the air flow of a wind tunnel as is the beam splitter 12. However, it is feasible to eliminate the use of any optical elements along the central axis of the apparatus so that the arrangement may be used in connection with a wind tunnel. Such an apparatus has been shown in FIGS. 3 to 5 to which reference is now made.

Figure 3:
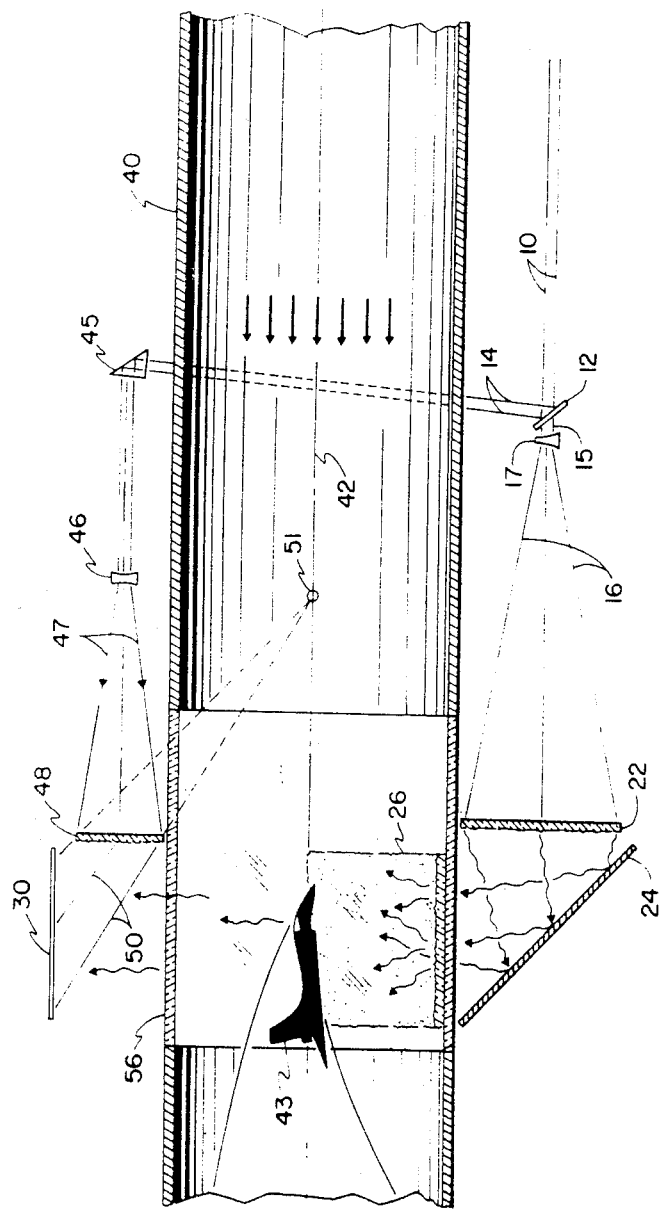
FIG. 3 is a cross-sectional view of another holographic apparatus embodying the present invention and suitable for use with a conventional wind tunnel.
Figure 4:
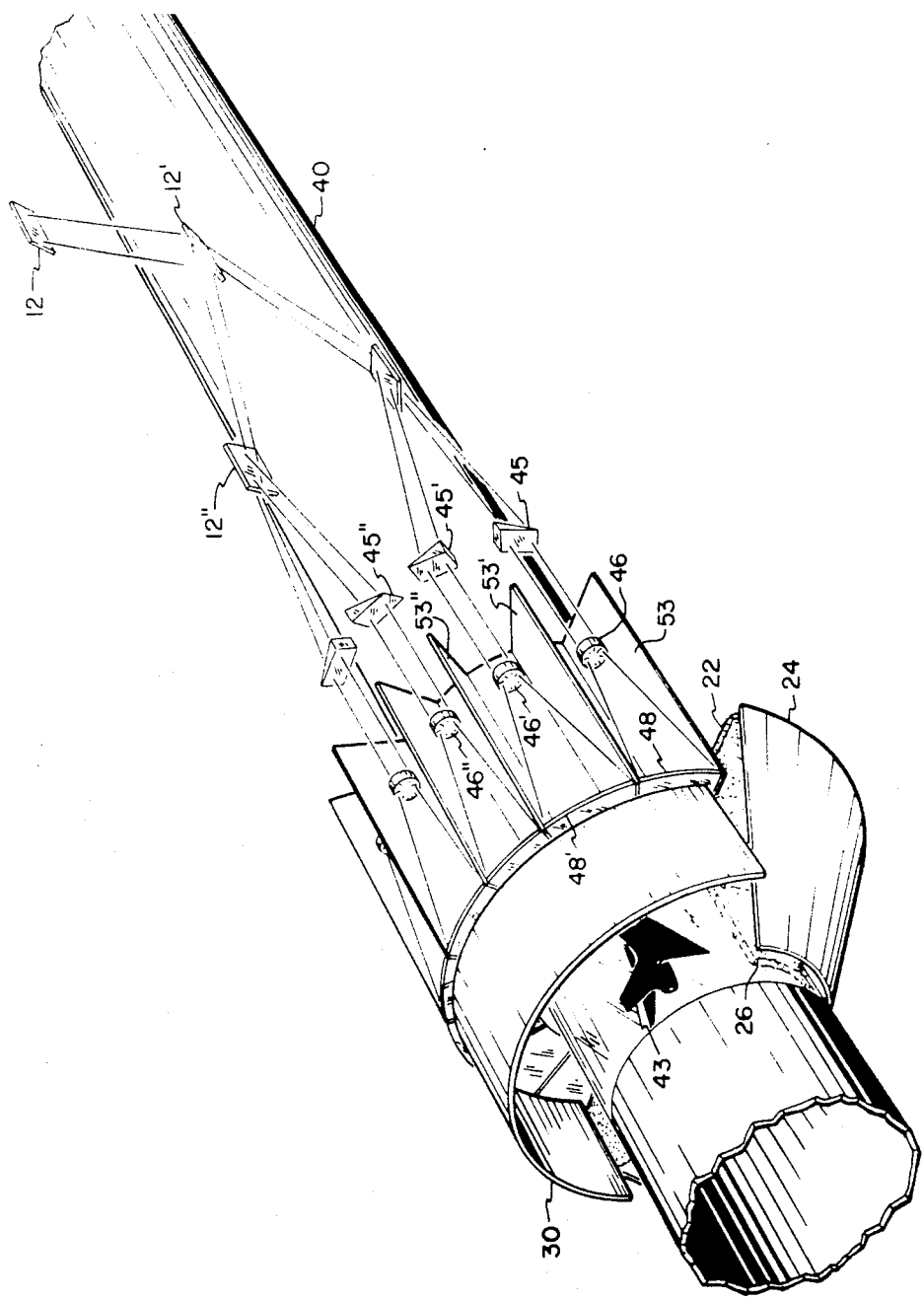
FIG. 4 is a view in perspective of the apparatus of FIG. 3.

As clearly shown in FIGS. 3 and 4, there is provided a wind tunnel 40 which has been shown of cylindrical cross section. However, it will be understood that the shape of the wind tunnel is immaterial and may be square or some other cross sectional shape. As shown particularly in FIG. 3, the incoming coherent beam 10 is split up by a beam splitter 12 into a reference beam 14 and a scene beam 15. The scene beam 15 is again enlarged by a negative lens 17 which may again be a diverging lens of the type shown in FIG. 1 to generate a diverging cone-shaped scene beam 16.

The first diffuser 22 may again be provided in the path of the scene beam and the diffused light may be reflected by a conical reflector 24. There may be provided a second cylindrical light diffuser 26, all as previously described. The cylindrical recording material 30 may be provided contiguous to the diffuser 26. The various elements 22, 24, 26 and 30 may have the same shape previously described. Accordingly, the recording material 30 extends along half the surface of the cylinder having a central axis 42 coinciding with the axis of the wind tunnel 40. A model 43 such, for example, as an airplane may be suspended in the wind tunnel 40 so that the aerodynamic disturbance caused by the model 43 may be holographed.

As described so far the arrangement is essentially the same as shown in FIGS. 1 and 2. However, the reference beam is caused to fall on the recording material 30 in a different manner. The reference beam 14 is now deflected by a prism or wedge 45 and is expanded by a negative lens 46 to provide an expanded reference beam 47. The reference beam 47 is diffracted by a special optical element 48 consisting of a previously recorded hologram. How the hologram is recorded will be explained hereinafter in connection with FIG. 6. Suffice it to say at this point that the hologram 48 serving as an optical element diffracts the reference beam 47 as shown at 50 onto the recording material 30 in such a manner that it appears to originate from a virtual reference point source 51 located along the central axis 42.

It should be noted again that the scene beam 16 impinges on the recorded material 30 substantially at an angle of 90°. On the other hand, the reference beam 50 is made to impinge on the recording material 30 at an angle of approximately 20° so that the angle between reference and scene beams at the recording material is approximately 70°. The small reference beam angle in part is necessary so as to avoid being obstructed by the object to be holographed.

Actually, it will be appreciated that the reference beam 47 has to be guided along the outer cylindrical surface of the wind tunnel 40. Therefore, in accordance with the present invention the reference beam is split up into a plurality of individual beams to facilitate directing them onto the optical element 48. As shown particularly in FIGS. 4 and 5, the reference beam 14 is split up, for example, into eight portions by a combination of beam splitters, prisms and negative lenses.

Figure 5:
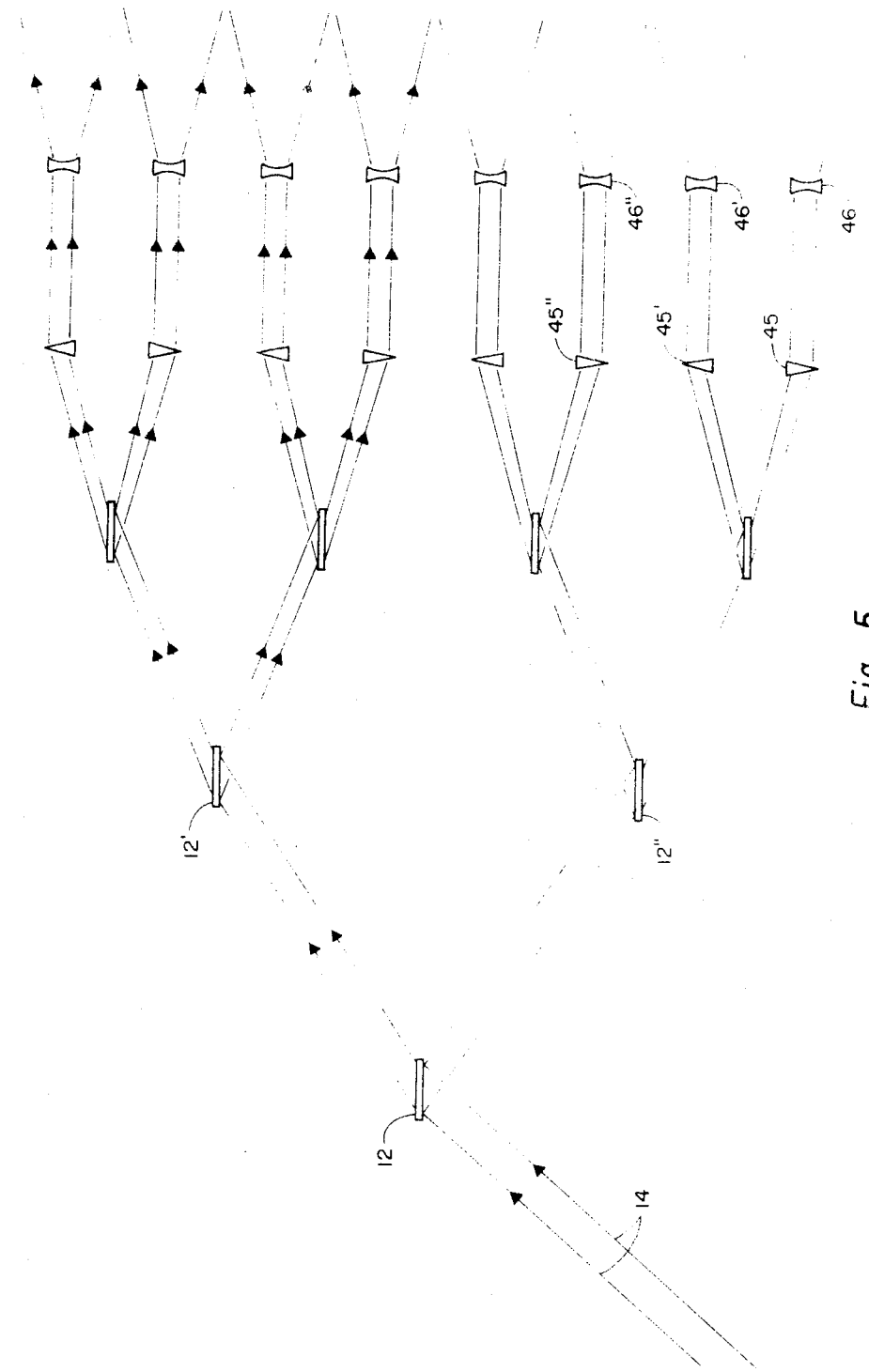
FIG. 5 is a developed view of a portion of the apparatus of FIGS. 3 and 4 illustrating how the original laser beam is divided to provide eight reference beams circumferentially disposed about substantially one half of the surface of the wind tunnel shown in FIGS. 3 and 4.

Thus, there is provided a plurality of beam splitters 12, 12', 12'' etc., each of which splits up an incoming beam such as a reference beam 14 into two portions. As shown in FIG. 5, there may be needed seven such beam splitters to provide eight reference beam portions. Each of the reference beams is then passed through a wedge or prism such as 45, 45', 45'' and thereupon through a set of negative lenses such as 45, 46' and 46''. In order to separate the individual reference beams from each other there may be provided a set of baffles 53, 53' etc. This in turn makes it convenient to break up the optical element 48 into individual components such as shown at 48, 48' etc. so that there is one optical element for each individual reference beam. It will, of course, be understood that more or less than eight reference beam portions may be used.

It will be understood that each of the reference beam portions has its virtual point source at 51 after it has been diffracted by the optical element 48. Actually if laser coherence or energy is limited it may be desirable to use a series of beam splitters, also for the scene beam 15 or illumination side just as are used on the reference beam 14. This will conserve energy and path length differences.

The apparatus of FIGS. 3 and 4 operates substantially in the same manner as previously described. The recorded hologram may be viewed again in the manner as previously described.

It should be noted that it is important to replace the developed hologram essentially in its original position so as to avoid distortions.

With the apparatus of the invention it is possible to calculate aerodynamic variables because the hologram permits to determine the localized index of refraction. It will be evident that the recorded hologram may be viewed either by reilluminating it with the original reference beam or with an approximation to the original reference beam.

Figure 6:
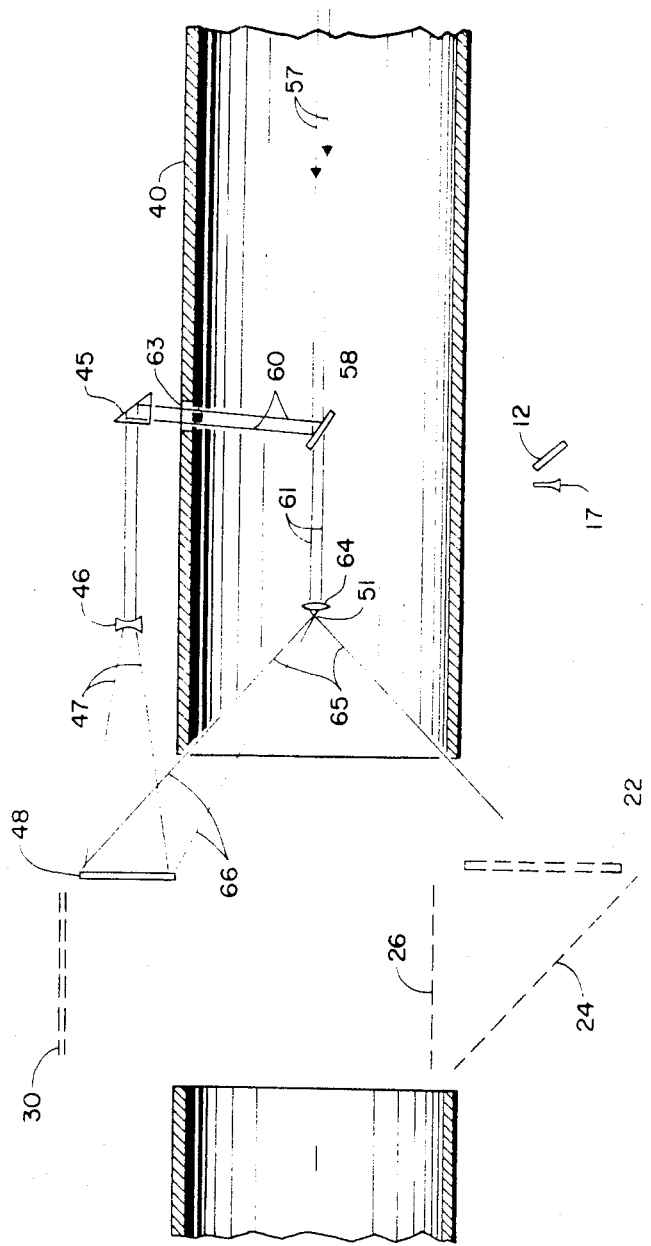
FIG. 6 is a cross sectional view similar to that of FIG. 3 but illustrating how a hologram may be generated in situ to provide an optical element for the holographic apparatus of FIGS. 3 and 4.

It now remains to explain how the optical element 48 is initially recorded. This is illustrated in FIG. 6. Some of the optical elements of the apparatus of FIG. 3 are shown in FIG. 6 such as the beam splitter 12, lens 17, diffusers 22,26, reflector 24 and recording material 30. Preferably, a portion of the wind tunnel shown at 56 in FIG. 3 is entirely removed so as not to interfere with the light. A special reference beam which may be called a subject beam is generated for this purpose. Thus, a coherent light beam 57 is sent through the central axis of the wind tunnel 40. The coherent beam 57 is split by beam splitter 58 into two portions 60 and 61. The beam portion 60 then impinges on the prism 45 and then onto the diverging lens 46 to generate the reference beam 47. It may be necessary to provide an aperture 63 in the wall of the wind tunnel 40 for the light to pass.

The special reference or subject beam 61 is now diverged by a lens 64 which may, for example, consist of a microscope objective. This will generate a diverging light beam 65, a portion 66 of which impinges on the recording material 48. Accordingly, when the recording material 48 is developed, replaced and illuminated by the reference beam 47, it will regenerate the subject beam 66 having a virtual point source at 51 along the central axis of the apparatus.

It will, of course, be understood that the lens 64 and beam splitter 58 are removed and the wind tunnel portion 56 replaced before the apparatus is ready to be used for actual recording of aerodynamic holograms on the recording material 30. Hence, it will be appreciated that the optical element 48 will generate a virtual light source at the location 51 along the central axis 42 of the wind tunnel without the need of any optical elements to be disposed within the wind tunnel 40.

There has thus been disclosed a holographic apparatus for recording in transmission aerodynamic phenomena such as the wake of a bullet or disturbances caused by spark gaps or the like or the aerodynamic flow around a model in a wind tunnel. The apparatus makes it possible to view substantially over 180° asymmetric flow phenomena which permit detailed analysis and the calculation of aerodynamic variables. This is made possible because knowledge of the variation of the index of refraction within each point of the object may be obtained. One of the embodiments is particularly suited for investigating the aerodynamic wake of a bullet while the other is suitable for use with a wind tunnel. It features a special optical element consisting of a hologram. The resulting hologram may be viewed over a continuous range of angles extending substantially over 180°.

What is claimed is:

1. A holographic apparatus for recording an aerodynamic phenomenon over a large portion of the surface of a cylinder, said apparatus comprising:
    a. means for generating a coherent beam of light;
    b. means for splitting said beam into a reference beam and a scene beam;
    c. a recording material extending over a substantial portion of the surface of a cylinder, said cylinder having a central axis, whereby the aerodynamic phenomenon along the central axis may be recorded;
    d. a first negative lens disposed in the path of said reference beam for projecting it onto said recording material, said negative lens providing a virtual source for said reference beam located substantially along said central axis;
    e. a first diffuser disposed in the path of said scene beam;
    f. a conical reflector disposed in the path of the diffused scene beam and for directing said scene beam onto said recording material substantially normal thereto, said conical reflector having an axis substantially coinciding with said central axis;
    g. a second negative lens for directing said scene beam onto said first diffuser; and
    h. means for making the path of said reference beam substantially equal to the path of said scene beam.

2. Holographic apparatus as defined in claim 1 wherein a second diffuser is disposed in the path of said scene beam following said conical reflector.

3. Holographic apparatus as defined in claim 1 wherein a quarter wave plate is disposed in the path of said coherent beam to create a reference and a scene beam, each being circularly polarized.

4. Holographic apparatus as defined in claim 1 wherein the ratio $d/D$ is no more than 0.1, wherein D is the diameter of the cylinder forming said recording material, and wherein d is the diameter of the aerodynamic phenomenon to be recorded.

5. Holographic apparatus for recording an aerodynamic phenomenon in a wind tunnel or the like, said apparatus comprising:
    a. a recording material extending substantially over one half of the surface of a cylinder, said cylinder having a central axis;
    b. means for generating a coherent scene beam;
    c. a first diffuser of substantially annular shape disposed in the path of said scene beam and extending substantially at right angles to said recording material over substantially 180°;
    d. a conical reflector for reflecting said scene beam diffused by said first diffuser through a wind tunnel and substantially normal onto said recording material, said conical reflector having an axis substantially coinciding with said central axis;
    e. an optical element consisting of a previously recorded hologram extending adjacent to and substantially coextensive with said first diffuser, said hologram providing, when illuminated, a reference beam having a virtual source substantially along said central axis and arranged for illuminating said recording material; and
    f. means for generating a plurality of reference beams circumferentially spaced about said holographic elements for generating a light beam which is diffracted by said element onto said recording material.

6. Holographic apparatus as defined in claim 5 wherein a separate optical holographic element is provided for each reference beam.

7. Holographic apparatus as defined in claim 6 wherein baffles are provided between adjacent reference beams to minimize interference therebetween.

8. Holographic apparatus as defined in claim 5 wherein a second diffuser is provided in the path of the diffused scene beam and following said conical reflector.

9. Apparatus for generating a holographic optical element which, when illuminated, will provide a reference beam having a virtual source in a central axis, said apparatus comprising:

a. a portion of a wind tunnel;
b. a recording material disposed about said wind tunnel over a large portion thereof and forming an annular surface substantially at right angles to said central axis, said recording material being adapted to be disposed near a second, semi-cylindrical recording material for recording a hologram of a phenomenon in the wind tunnel;
c. means for generating a plurality of reference beams, each being coherent, said plurality of reference beams illuminating said recording material; and
d. means including a lens disposed substantially along said central axis for generating a scene beam and for directing it onto said recording material, whereby the developed hologram will recreate said scene beam when illuminated by said plurality of reference beams to provide a reference beam illumination for the second recording material having a virtual point source substantially at the location of said lens.

* * * * *